Oct. 24, 1967 R. G. REED 3,349,396

FLEXIBLE RADIATION ATTENUATOR

Filed Feb. 3, 1966

INVENTOR.
ROBERT G. REED
BY Richard D. Seibel
ATTORNEY

United States Patent Office 3,349,396
Patented Oct. 24, 1967

3,349,396
FLEXIBLE RADIATION ATTENUATOR
Robert G. Reed, Tulsa, Okla., assignor to
North American Aviation, Inc.
Filed Feb. 3, 1966, Ser. No. 525,273
16 Claims. (Cl. 343—18)

This invention relates to a flexible radiation attenuator and more particularly relates to a flexible material for attenuating radiation in the frequency range of radar.

In order to camouflage ground equipment from searching radar it is desirable to make the equipment have a radar reflectivity approximating that of the surrounding terrain. In this way any equipment is virtually indistinguishable from the so-called ground clutter. It is usually found, however, that military equipment has a large amount of metal in the construction and this gives a high radar reflectivity so that the equipment is readily detected by radar. Rigid radar attenuating materials have been devised that can be applied to equipment or used in the construction of equipment to minimize radar reflectivity. These, however, are relatively expensive for use with most equipment and are impractical in many situations. In addition, the regular outlines of the equipment remain for detection visually or by careful analysis of radar returns. It is therefore desirable to have a flexible radar attenuating material that can be used to cover stationary or mobile objects in a non-uniform manner to provide radar camouflage.

It is therefore a broad object of this invention to provide an improved radar camouflage.

Thus in the practice of this invention according to a preferred embodiment there is provided a blanket of radar attenuating material that is flexible and can be used to cover equipment or folded or rolled into a lightweight package when not in use. An interference type of radar attenuator is employed wherein electrically thin layers or sheets of resistive material are spaced apart in the same order of magnitude as one-fourth of the wavelength of radiation in the frequency range of radar. In a preferred embodiment the resistive layers comprise fabric sheets coated with an elastomer having carbon particles dispersed therein. Spacing between individual resistive layers is provided by a deeply embossed plastic sheet. A typical blanket has a resistive absorber sheet on the side upon which radar is expected to impinge. Loosely underlying this is a spacer sheet of embossed plastic followed by another resistive absorber sheet and additional embossed spacer sheets and absorber sheets in consecutive alternation as may be required to obtain a desired attenuation of radar in a particular frequency range. On the far side of the assemblage of absorber sheets and spacer sheets is an electrically conductive layer such as metal coated plastic.

In a preferred embodiment the individual sheets are about two feet square and a collection of such sheets giving radar attenuation is enclosed in a water proof plastic envelope. Individual envelopes are provided with edge fasteners so that they can be assembled into a blanket of any selected size. The individual sheets of material in the envelope loosely overlie each other so that some relative motion can occur and the assembly remains flexible. Good reduction of radar echo over a broad frequency range is obtained by employing such a blanket over metal structures so that the radar echo approximates the appearance of ground clutter.

In another embodiment articles of clothing are tailored from similar assemblages of radar absorbing sheets and spacer sheets for providing radar camouflage for personnel. Other aspects of flexible attenuators not claimed herein are described and claimed in copending patent application Serial Number 525,274 filed herewith entitled, "Flexible Radiation Attenuator," by Joseph R. Rosenthal and assigned to North American Aviation, Inc., the assignee of this application.

It is therefore a broad object of this invention to provide radar camouflage.

It is another object of this invention to minimize radar reflection.

It is a further object of this invention to provide a flexible radar attenuating blanket.

It is another object of this invention to provide a radar attenuating article of clothing.

Other objects and many of the attendant advantages of this invention will be readily appreciated as the same becomes better understood by reference to the following detailed description when considered in connection with the accompanying drawings wherein.

Throughout the drawings like numerals refer to like parts.

Figure 1:
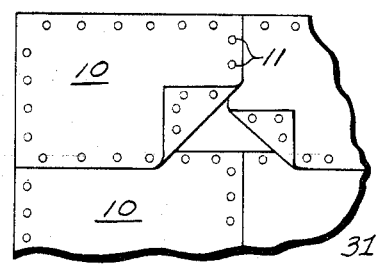
FIG. 1 illustrates a portion of a blanket constructed according to the principles of this invention.

As radar or other electromagnetic wave energy impinges on a structure, the amount of energy reflected from the surface is dependent on the degree of mismatch between the impedance of the structure and the characteristic impedance of air or free space. Thus it is found that a material having a very low impedance, such as a metal, has a large mismatch; its impedance being considerably below the impedance of free space. A large radar reflection is obtained from such material in the same way a standing wave is reflected in a metal terminated wave guide. Likewise a material having an impedance very nearly that of free space reflects an extremely small amount of radar energy.

Vehicles and most military equipment are either constructed of metal or have internal components of metal that will reflect a substantial quantity of radar energy. Because of this it is impossible to make equipment completely transparent to radar and, as an alternative, attenuation of the radar energy that would normally be reflected by the equipment is preferred. In order to reduce reflections from a surface, a match between the impedance of the surface and free space is desirable. In the attenuating structure described in the illustrative embodiment the effective impedance of the structure to an incident radar beam is very similar to the impedance of free space. The structure comprises a plurality of resistive sheets spaced apart from a metal reflector. The impedance as seen by the radar beam is the resultant of the impedances of all of the resistive structure outside the metal just as in a transmission line where the impedance is determined by all elements. The impedance at the surface or at any point witihn the structure is obtained by consideration of the impedance of all of the components inwardly of that point.

In a preferred embodiment of an attenuating structure multiple layers of partly conductive material are employed to provide a gradual change in the impedance, or its reciprocal, the admittance, between that of free space and that of a metallic internal layer. By providing a gradual transition of increasing admittance, only a low amount of reflection is obtained at any of the individual layers since each is only slightly different from the admittance of the overlying material. The admittance of each of the conductive layers is therefore chosen as to provide a smooth transition in admittance.

As previously mentioned, a radar beam impinging on a metal surface is reflected therefrom in the same way that reflection to form a standing wave occurs in a metal terminated wave guide. If a sheet of material having a resistivity of 377 ohms per square is placed at one-quarter wavelength spacing from the metal termination, the standing wave set up has a maximum electric field at the resistive material and the energy in the wave is attenuated by conduction in the resistive material. Such an arrangement is termed a Salisbury screen or quarter wave screen. A resistivity of 377 ohms per square is employed to match the impedance of free space so that no reflection is obtained in the resistive material. As viewed along the wave guide, this type of termination appears like an infinitely long wave guide as no standing wave is reflected. This occurs for a specific wavelength and reflections occur at other wavelengths with magnitudes determined by their relation to the wavelength for which the screen is tuned. The wavelength of importance is the wavelength in the material between the resistive material and the metal termination and this is dependent on the dielectric constant of the material therebetween.

In order to provide a good attenuating structure capable of attenuating a variety of radar beams, it is desirable to have high attenuation throughout the range of from about $2 \times 10^9$ to $20 \times 10^9$ cycles per second or 2 to 20 gHz. This corresponds to a wavelength range of from about 15 to about 1.5 centimeters. In order to obtain a broad band of attenuation it would appear desirable to have a multiplicity of quarter wave screens, however, there is an interaction between screens when more than one is employed and it is also necessary to limit the number due to weight considerations. A limited number of absorber sheets or screens must be used in any practical structure and attenuation is optimized by varying the electrical properties of the individual sheets. In a broad band structure for attenuating waves in the frequency range of from 2 to 20 gHz., a total thickness of composite of about one inch is employed to give approximately quarter wave attenuation for the longer waves. The space between individual sheets or screens is in turn selected to provide approximately quarter wave attenuation for the shorter waves. Thus it is desirable to construct a composite structure having a series of resistive layers spaced apart by a dielectric material and also spaced apart from a conductive sheet. It is preferred to form the conductive sheet as a portion of the assembly so that reflection occurs at a known position relative to the resistive layers. In a removable cover as described herein the conductive sheet is part of the cover. In the absence of the conductive sheet, radar would reflect from the covered equipment and very little attenuation would be obtained.

FIG. 1 illustrates a blanket of radar attenuating material incorporating the principles of this invention. As illustrated in this figure there is provided a blanket of material fabricated from individual segments 10 of flexible radiation attenuating material. These segments are fastened together at adjoining edges by conventional snap fasteners 11 so that a plurality of individual segments can be assembled into a blanket having any selected extent. It is found that segments that are about 24 inches square are readily handled and assembled into extensive blankets. It will be apparent that other polygonal segments such as triangles or hexagons might be employed, however rectangular segments are preferred. It is also found that rolls of radar attenuator about three feet wide and 30 or 40 feet long are readily employed in many applications.

A modular blanket such as illustrated in FIG. 1 is preferred since any damage occurring to the blanket is readily repaired by removing the damaged segment and replacing with an undamaged segment. The snap fasteners can readily be made of metal or can be of plastic material. Metal snaps in a nine inch square pattern had very slight effect on radar reflectivity as compared with a similar segment without metal snaps. In addition it is apparent that other types of fasteners can be employed along the adjoining edges of the segments such as, for example, Velcro strips, buttons, or slide fasteners. It will also be apparent that individual segments can be fastened to a net or canvas backing to form a modular blanket of any desired size.

Figure 2:
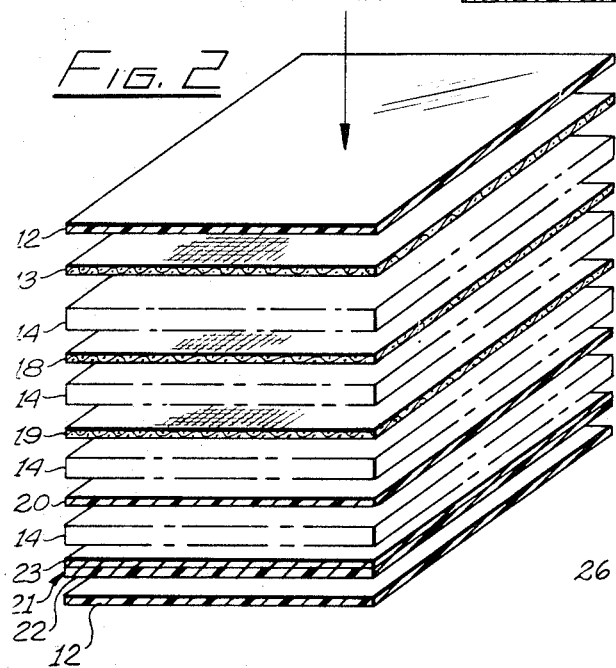
FIG. 2 illustrates an exploded section of the blanket of FIG. 1.

FIG. 2 illustrates an exploded cross-section of a typical segment 10 of a modular blanket such as illustrated in FIG. 1. The individual segments of the blanket are each fabricated as sealed envelopes of plastic material with radar attenuating materials enclosed. A suitable material for the envelope is found to be plastic sheet such as polyvinyl chloride with a thickness of about 0.008 inch which is sufficiently strong to resist rough handling and yet is quite flexible. Other materials can be employed for the water proof envelope such as polyester resins, polyvinyl acetate modified polyvinyl chloride, polyethylene or the like. Envelopes of such material can readily be made from flat sheets that are heat sealed or adhesively bonded around the edges.

As illustrated in FIG. 2 a small section of one of the segments 10 is exploded for purposes of illustration. At either side of the assemblage is a plastic sheet 12 that forms a wall of the aforementioned envelope of a segment of the blanket. In the illustration of FIG. 2 the threat of radar is considered to come from the upper portion of the figure and impinge on the upper portion of the assemblage as illustrated. Thus the first material encountered by impinging radar is one side of the plastic envelope 12. Loosely underlying the plastic envelope is an absorber sheet 13. A typical absorber sheet 13 comprises a glass fabric that has an elastomer coated thereon such as neoprene or the like, or other flexible synthetic resin. Suspended in the elastomer in the coating are particles of carbon or similar semi-conductive materials in order to obtain a selected impedance in the absorber sheet. The impedance of the absorber sheet can also be modified by the addition of metal powders such as aluminum. Due to the resistance of an absorber sheet there is an attenuation of radar energy when the sheet is interposed in a beam of radar frequency radiation. Thus the impedance of the sheet can be designated by the so-called insertion loss due to interposing the sheet between the transmitting antenna and receiving antenna of a radar link. Thus in a typical testing procedure the intensity of radar energy received from a transmitter is measured with no solid material in the radar path. The intensity of radiation received is then measured with the sheet material interposed about 20 degrees off normal to the radar frequency beam. The insertion loss of the sheet is then stated in terms of the power reduction in decibels. In a typical blanket of radar attenuating material constructed according to the principles of this invention the insertion loss of the absorber sheets was measured at 9.375 gHz. or $9.375 \times 10^9$ cycles per second. In a typical radar absorbing blanket the absorber sheet 13 has an insertion loss of about 1.9 db at this frequency.

In order to control the resistivity and insertion loss of the sheets, the proportion of carbon in the coating, the thickness of the coating and the type of carbon in the coating are controlled. The total weight of coating material on the fabric is preferably in excess of 1 gram per square foot of fabric since lower weights give difficulty in obtaining appreciable electrical conductivity. It is also preferable that the coating thickness be less than 40 grams per square foot as greater thicknesses lead to sheets that are unduly stiff and lack the drapability needed to form complex curvatures.

Table I gives some examples of conductive sheets useful in the practice of this invention. Many other variations of such sheets are readily prepared. All of these sheets are prepared on a commercially designated 116 type glass cloth which is a 59 x 57 thread count fabric having a plain weave. The fabric is about 0.004 inch thick before coating and in a greige or unfinished condition. The conductive compositions were applied by spraying, box brushing, or dip coating of the neoprene-carbon mixture in sufficient solvent of 80 parts toluene, 20 parts xylene to obtain a suitable viscosity, followed by solvent evaporation and heating curing.

TABLE I

| Insertion Loss (db) | Parts Neoprene Resin | Parts Carbon | | | Coating Weight (gm./ft.²) |
|---|---|---|---|---|---|
| | | Graphite | Acetylene Black | Furnace Black | |
| 0.6 | 100 | 51.2 | | | 8.3 |
| 1.6 | 100 | 51.2 | | | 15.0 |
| 1.9 | 100 | 51.2 | | | 17.1 |
| 2.3 | 100 | 60.5 | | | 15.4 |
| 2.9 | 100 | | | 20.5 | 7.6 |
| 3.1 | 100 | | | 20.5 | 8.1 |
| 3.3 | 100 | 60.5 | | | 27.3 |
| 4.0 | 100 | | 51.2 | | 3.7 |
| 5.4 | 100 | 80.0 | | | 17.4 |
| 7.1 | 100 | | 34.1 | | 10.3 |
| 7.3 | 100 | | 80.0 | | 6.4 |
| 7.4 | 100 | | | 23.5 | 16.5 |
| 8.0 | 100 | | 60.5 | | 10.6 |
| 8.9 | 100 | 80.0 | | | 29.2 |

Loosely underlying the absorber sheet 13 is a spacer sheet 14. It has been found that a highly desirable spacer sheet is an embossed polyethylene film 0.005 inch thick. This film is embossed by vacuum forming or the like into a sheet having a regular array of circular mesas 16 as is more clearly illustrated as the layer 31 in FIG. 4 and shown only schematically in FIG. 2. These individual mesas are from about 3/16 to 3/8 inch in diameter and stand approximately 0.18 inch high. Thus the sheet has a plurality of raised mesas on one side and a plurality of corresponding dimples on the other side so that the raised mesas lie in an imaginary surface parallel to another imaginary surface in which other portions of the film lie. The individual mesas have side walls 17 that are substantially perpendicular to the general extent of the plastic film 14 so that the embossed sheet has some compressive strength. The spacer layer thus has an effective thickness of about 0.18 to 0.19 inch and retains this thickness under small loads. An embossed film of plastic is a preferred spacer layer since it has appreciable compressive strength and is a very lightweight construction. Such a sheet is highly flexible and has a very low dielectric constant so that the spacer layer is electrically transparent. The dielectric constant of such a material has been found to be about 1.05 at a frequency of 3 gHz. The sheet employed in a preferred embodiment is imperforate, however, holes through the sheet are acceptable and serve to decrease the weight slightly. It will also be apparent that a different pattern of raised portions on the sheet can be employed to provide a means for holding the absorber sheets a uniform distance apart, and other spacer layers such as described in the aforementioned copending application can be employed in some circumstances.

Loosely underlying the spacer layer 14 is an absorber sheet 18 which in a typical blanket constructed according to the principles of this invention has an insertion loss of about 2.9 db. Loosely underlying the absorber sheet 18 is another spacer sheet 14 of embossed plastic substantially identical to the aforementioned spacer sheet 14. Loosely underlying the second spacer sheet 14 is an absorber sheet 19 that in a typical blanket has an insertion loss of about 3.1 db. Loosely underlying the absorber sheet 19 is another spacer layer 14 followed by an absorber sheet 20 having an insertion loss of about 7.1 db. Loosely underlying the absorber sheet 20 is a spacer layer 14 such as previously described. Thus the absorber sheets in the assemblage are in consecutive alternation with the spacer sheets. That is, between each pair of spacer sheets is an absorber sheet and between each pair of absorber sheets is a spacer sheet.

Loosely underlying the final spacer layer 14 is a flexible conductive sheet 21. This conductive sheet comprises a layer of thin plastic 22 such as polyethylene terephthalate, polyvinyl chloride, polyethylene, or the like on which is coated a thin layer of metal 23 such as aluminum. A final loosely underlying layer in the assemblage comprises a side of the plastic envelope 12 enclosing the segment of the flexible blanket. It will be apparent that the conductive sheet and plastic envelope can be combined to reduce the total number of layers if desired.

In constructing a segment of a blanket as illustrated in FIGS. 1 and 2 it is preferred to stack loose sheets of material of the type described and heat seal or adhesively bond the surrounding envelope around most of the edge of the assemblage. A small opening is left and the assemblage has excess air removed to an internal pressure no more than the pressure corresponding to the maximum altitude at which such an assemblage is to be employed. A vacuum in the envelope is undesirable since there is a tendency to crush the spacer layer and the segments are also stiffer when evacuated. The envelope is sealed by heat or adhesive and snap fasteners or the like are attached along the edge of the envelope. Air is removed from the envelope so that the sheets are gently compressed together by atmospheric pressure so that the individual absorber sheets are in loose face to face juxtaposition a selected distance apart corresponding to the thickness of the spacer sheets.

Since the radar attenuation in an assemblage such as described is due to an interference type phenomena that is related to the impedance of absorber sheets and to their spacing from the conductive sheet, it is important that some means be provided for maintaining the absorber sheets a substantially fixed distance apart. Slightly reduced pressure in the envelope has this effect and it can also be obtained by lightly quilting the assembly with conventional stitches before sealing to hold each of the absorber sheets a selected distance from the conductive sheet. Light quilting of the absorber sheets, spacer sheets and conductive sheet holds the spacing of the sheets but will not interfere with small relative lateral movement between the sheets and thereby does not noticeably reduce the flexibility of the assemblage. Similarly it may be desirable to stitch the sheets together around the edge of the segment before sealing to prevent large slippage of the sheets.

Tests of a blanket of material constructed as described in relation to FIGS. 1 and 2 were conducted in an antenna range with the blanket covering a flat aluminum plate normal to a radar beam. It was found that the blanket was an excellent attenuator of radiation in the frequency range from about 2 gHz. to 10 gHz. with reductions of radar echo by more than 20 db in the frequency range above 3 gHz. The total thickness of such a blanket is about 7/8 inch and it weighs about 0.41 pounds per square foot.

It will be apparent that many variations can be made in the materials employed in an assemblage such as has been described and illustrated in FIGS. 1 and 2. Thus the plastic employed for the envelope and spacer layers can be selected from a wide variety of materials such as Saran, polyimides, polyesters, polyethylene or the like. If it is desired to provide infrared attenuation fluorinated plastics such as polytetrafluoroethylene or fluorinated ethylene-propylene polymers can be used for the surrounding envelope. Similarly a mottled pattern of colors can be used on the plastic to provide optical camouflage. The absorber sheets employed are not necessarily made of glass fabric but other flexible fabrics such as cotton, wool or synthetic fabrics can also be employed. Films of plastic with carbon or metal powders dispersed thereon or therein can also be used for absorber sheets. An alternative flexible conductive sheet comprises metal foil or a fine wire screen with a mesh pattern less than one-fourth of the wavelength of the threat frequencies.

In addition to covering equipment that may be deployed in the field, it is also desirable to protect personnel from detection by radar. In recent years radar equipment that detects the movement of metal objects such as arms, ammunition or the like has been developed. It is particularly easy for such radar to detect the motion of metal protective helmets since they are relatively large reflecting objects. It is therefore desirable to provide articles of clothing for personnel that will protect them from detection by radar.

Figure 3:
FIG. 3 illustrates a radar attenuating jacket and helmet constructed according to the principles of this invention.

Thus there is illustrated in FIG. 3 a jacket 26 and a helmet cover 27 that attenuate radar energy and minimize radar reflection. The jacket 26 serves as a replacement for a conventional field jacket and can readily be worn over ammunition belts, canteens and other items of equipment that have an appreciable radar reflection. Similarly a helmet cover 27 minimizes radar reflection from a conventional steel helmet.

Figure 4:
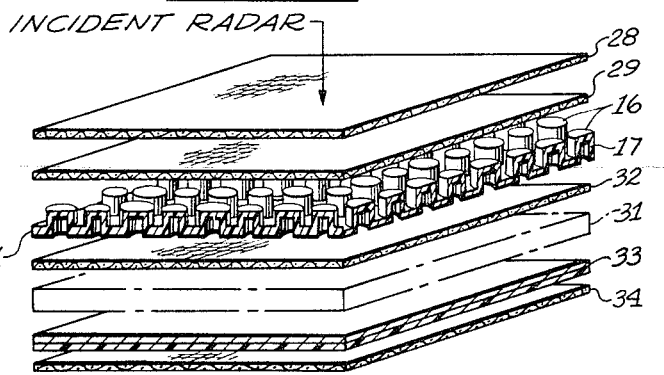
FIGURE 4 illustrates an exploded typical section of the jacket of FIG. 3.

FIG. 4 illustrates a cross section of a jacket 26 or of a helmet cover 27 constructed according to the principles of this invention. On the exterior of the article of clothing, namely the side upon which a radar threat is to be expected, there is provided a layer of conventional waterproof camouflage fabric 28 that has a mottled pattern of varying colors to provide optical camouflage. This material also provides external strength to the garment to minimize damage due to rough handling. Loosely underlying the camouflage fabric 28 is a flexible absorber sheet 29 of fabric coated with an elastomer having carbon dispersed therein. In a typical jacket constructed to the principles of this invention the absorber sheet 29 has an insertion loss of 2.9 db. Somewhat better attenuation has been demonstrated in some frequency ranges with an absorber sheet having an insertion loss of 1.9 db. Loosely underlying the absorber sheet 29 is a spacer sheet 17 such as the embossed plastic film previously described in relation to FIG. 2. Loosely underlying the spacer sheet 17 is another absorber sheet 32. Loosely underlying the absorber sheet 32 is another spacer sheet 31 and loosely underlying the spacer sheet 31 is a conductive sheet 33 which is preferably a sheet of plastic with metal coated thereon. Loosely underlying the conductive sheet 33 is a light cotton fabric 34 that forms the internal lining of the jacket. It will be apparent that, if desired, additional thermal insulating layers can be added to a jacket without departing from the principles of this invention.

In a jacket constructed of a sandwich material such as described and illustrated in FIG. 4 the individual sheets of material forming panels of the jacket were tailored and assembled in a conventional manner similar to any interlined garment. It was not found necessary to quilt such a jacket to prevent slippage of the individual pieces, however, such a quilting could be employed if felt desirable. A flat panel quilted in a nine inch square pattern showed somewhat better radar attenuation after quilting than before. The front closure of the jacket can readily be effected with loop and pile nylon such as is available commercially under the trademark Velcro, or with other conventional fasteners.

A helmet cover was also fabricated according to the principles of this invention. A cross-section of the helmet cover is substantially the identical to the cross section of the jacket described and illustrated in FIG. 4. If it is desired a helmet cover can be made with a similar cross section with omission of the conductive layer 33 since the helmet cover will be spaced apart from the metal helmet by a substantially fixed amount during use and good radar attenuation is obtained. A jacket and helmet cover such as described and illustrated give good radar attenuation and minimum radar reflectivity in the frequency range of from 8 to 24 gHz. despite the presence of metal objects inside the jacket and helmet cover.

Many modifications of the radar attenuating material described and illustrated can be provided. These flexible materials can have any of a variety of thicknesses and frequency ranges of attenuation. Thus different thicknesses of spacer layer can be employed as well as different insertion losses in the absorber sheets. Also differing numbers of absorber sheets and spacer sheets can be employed to provide a particular thickness and frequency range. Other shapes can also be employed to provide covers for personnel equipment such as rifles, field packs and the like. Similarly, tailored covers can be made for specific articles of equipment such as stationary or moving vehicles, artillery, and the like.

Obviously many modifications and variations of the present invention are possible in the light of the above teachings. It is therefore to be understood that within the scope of the appended claims the invention may be practiced otherwise than as specifically described.

What is claimed is:

1. A flexible radiation attenuator comprising:
   a flexible conductive sheet;
   a flexible absorber sheet coextensive with said conductive sheet and loosely overlying said conductive sheet;
   a flexible spacer sheet interposed between said conductive sheet and said absorber sheet; and
   a flexible waterproof envelope containing said sheets for maintaining said sheets in relatively loose face to face juxtaposition.

2. A flexible attenuator as defined in claim 1 further comprising means adjacent the edges of said envelope for securing a plurality of similar envelopes together.

3. A flexible attenuator as defined in claim 2 wherein said envelopes are flat rectangles having a slightly reduced pressure therein for maintaining said sheets a fixed distance apart; and wherein
   said means for securing a plurality of similar envelopes together comprise snap fasteners.

4. A flexible radiation attenuator as defined in claim 1 further comprising:
   a plurality of flexible spacer sheets coextensive with said conductive sheet; and
   a plurality of flexible absorber sheets coextensive with said conductive sheet, said spacer sheets and absorber sheets loosely overlying each other in consecutive alternation for providing radar attenuation over a broad band of frequencies.

5. A flexible radiation attenuator as defined in claim 1 wherein said conductive sheet comprises a layer of metal deposited on a plastic sheet that forms a portion of said envelope.

6. A flexible radiation attenuator comprising:
   a flexible conductive sheet;
   a flexible absorber sheet coextensive with said conductive sheet and loosely overlying said conductive sheet;
   a flexible spacer sheet interposed between said conductive and absorber sheets, said spacer sheet comprising a film of plastic having first and second surface portions fixedly spaced from each other; and
   means for maintaining all of said sheets in relatively loose face to face juxtaposition to permit minor relative lateral motion of said sheets without impairing the flexibility thereof.

7. A flexible radiation attenuator as defined in claim 6 further comprising:
   a second spacer sheet coextensive with said conductive sheet; and
   a second flexible absorber sheet coextensive with said conductive sheet, said spacer sheets and absorber sheets loosely overlying each other in consecutive alternation; and
   wherein each of said spacer sheets comprises a flexible plastic sheet having an effective thickness of about 0.18 to 0.19 inch; and wherein said plurality of absorber sheets comprises:
      a first absorber sheet separated from said conductive sheet by one of said spacer sheets, said first absorber sheet having an insertion loss of about 7.4 db; and
      a second absorber sheet separated from said first absorber sheet by one of said spacer sheets, said second absorber sheet having an insertion loss of about 2.9 db.

8. A flexible radiation attenuator as defined in claim 6 further comprising:
a plurality of flexible spacer sheets coextensive with said conductive sheet; and
a plurality of flexible absorber sheets coextensive with said conductive sheet, said spacer sheets and absorber sheets loosely overlying each other in consecutive alternation; and
wherein each of said spacer sheets comprises a flexible plastic sheet having an effective thickness of about 0.18 to 0.19 inch; and wherein said plurality of absorber sheets comprises:
a first absorber sheet separated from said conductive sheet by one of said spacer sheets, said first absorber sheet having an insertion loss of about 7.1 db;
a second absorber sheet separated from said first absorber sheet by one of said spacer sheets, said second absorber sheet having an insertion loss of about 3.1 lb;
a third absorber sheet separated from said second absorber sheet by one of said spacer sheets, said third absorber sheet having an insertion loss of about 2.9 db; and
a fourth absorber sheet separated from said third absorber sheet by one of said spacer sheets, said fourth absorber sheet having an insertion loss of about 1.9 db.

9. A flexible radiation attenuator comprising:
a flexible conductive sheet;
a flexible absorber sheet coextensive with said conductive sheet and loosely overlying said conductive sheet;
a flexible spacer sheet interposed between said conductive and absorber sheets, said spacer sheet comprising a film of polyethylene embossed with an array of raised mesas having first and second surface portions fixedly spaced from each other; and
means for maintaining all of said sheets in relatively loose face-to-face juxtaposition.

10. A flexible protective cover comprising:
a plurality of relatively flat polygonal segments of flexible radiation attenuating material, said segments fastened together at adjoining edges to form a cover;
each of said segments comprising a waterproof sealed envelope and a plurality of separate flexible sheets in said envelope, said sheets cooperating to attenuate electromagnetic energy in the frequency range of radar.

11. A cover as defined in claim 10 wherein said sheets comprise:
a flexible conductive sheet;
a flexible absorber sheet coextensive with said conductive sheet and loosely overlying said conductive sheet; and
a flexible spacer sheet interposed between said conductive sheet and said absorber sheet.

12. A cover as defined in claim 10 wherein said sheets comprise:
a flexible conductive sheet;
a first spacer sheet coextensive with said conductive sheet and loosely overlying said conductive sheet;
a first absorber sheet having a selected impedance, said first absorber sheet being coextensive with said first spacer sheet and loosely overlying said first spacer sheet;
a second spacer sheet coextensive with said first absorber sheet and loosely overlying said first spacer sheet, said first and second spacer sheets each having a thickness in the same order of magnitude as one-fourth of the wavelength of radiation in the frequency range of radar; and
a second absorber sheet having a selected impedance, said second absorber sheet being coextensive with said second spacer sheet and loosely overlying said second spacer sheet.

13. A cover as defined in claim 11 wherein each of said spacer sheets comprises a film of plastic having a raised pattern thereon so that the effective thickness of the sheet is substantially greater than the thickness of the film; and
each of said absorber sheets comprises a fabric having semiconductive particles secured thereto.

14. A protective article of clothing comprising:
an electrically conductive layer near the interior of the article of clothing;
a spacer sheet loosely overlying the conductive layer having a thickness in the same order of magnitude as one-fourth of the wavelength of radiation in the frequency of radar; and
a flexible absorber sheet having an impedance between the impedance of free space and the impedance of said conductive layer, said absorber sheet loosely overlying said spacer layer.

15. A protective article of clothing as defined in claim 14 in the form of a jacket having the protective portion of the jacket covering at least a portion of a wearer's torso and further comprising a plurality of flexible spacer sheets and a plurality of flexible absorber sheets for providing radar attenuation over a broad band of frequencies.

16. An article of clothing as defined in claim 14 wherein said spacer sheet and absorber sheet are contoured to fit a metal helmet as a cover therefor.

References Cited

UNITED STATES PATENTS 2,599,944  6/1952  Salisbury _____ 343—18 X
2,875,435  2/1959  McMillan _____ 343—18

FOREIGN PATENTS 911,748  6/1954  Germany.

RODNEY D. BENNETT, *Primary Examiner.*

CHESTER L. JUSTUS, *Examiner.*

D. C. KAUFMAN, *Assistant Examiner.*